(12) United States Patent
Matsuo et al.

(10) Patent No.: US 6,657,362 B2
(45) Date of Patent: Dec. 2, 2003

(54) DRIVING APPARATUS AND METHOD FOR DRIVING A DRIVEN MEMBER

(75) Inventors: Takashi Matsuo, Osaka (JP); Shinya Matsuda, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/961,385

(22) Filed: Sep. 25, 2001

(65) Prior Publication Data

US 2002/0038988 A1 Apr. 4, 2002

(30) Foreign Application Priority Data

Sep. 29, 2000 (JP) ........................................ 2000-298402

(51) Int. Cl.$^7$ ............................................. H01L 41/08
(52) U.S. Cl. ............................... 310/323.02; 310/323.12
(58) Field of Search ....................... 310/323.02, 323.12, 310/323.16, 328

(56) References Cited

U.S. PATENT DOCUMENTS

| | | | | |
|---|---|---|---|---|
| 4,613,782 A | * | 9/1986 | Mori et al. | 310/323.02 |
| 4,950,135 A | * | 8/1990 | Tojo et al. | 417/410 |
| 5,132,582 A | * | 7/1992 | Hayashi et al. | 310/323.02 |
| 6,201,340 B1 | * | 3/2001 | Matsuda et al. | 310/328 |

FOREIGN PATENT DOCUMENTS

| | | |
|---|---|---|
| JP | 60-200776 | 10/1985 |
| JP | 10-225151 | 8/1998 |

* cited by examiner

*Primary Examiner*—Mark Budd
(74) *Attorney, Agent, or Firm*—Morrison & Foerster LLP

(57) ABSTRACT

A driving apparatus that improves the precision of driving control for a driven member by reliably ensuring the desired motion of the tip member. Regulating members, which hold a piezoelectric actuator at positions opposite a rotor R, are located at positions separated from the piezoelectric actuator by a distance L that equals or exceeds the amplitude of the oscillation generated in the piezoelectric actuator.

19 Claims, 14 Drawing Sheets phase difference 0° phase difference 45° phase difference 90° phase difference 135° phase difference 180°

(a)

(c)

DRIVING APPARATUS AND METHOD FOR DRIVING A DRIVEN MEMBER

FIELD OF THE INVENTION

The present invention relates to a driving apparatus and method of driving a driven member including a piezoelectric actuator using displacement elements such as piezoelectric elements or their equivalent.

DESCRIPTION OF THE RELATED ART

Piezoelectric actuators that are widely known in the conventional art have a construction in which a prescribed displacement is caused in multiple piezoelectric elements based on prescribed drive signals output thereto to cause the tip member (the synthesizing member) connected to the tip end of each displacement element to perform a prescribed motion (for example, an elliptical motion), so that a prescribed member that is in frictional contact with the tip member is rotated or moved in a linear fashion.

One such driving apparatus including a piezoelectric actuator includes, as shown in FIG. 18, for example, a piezoelectric actuator 801 that has the construction described above and is located close to the driven member S, and a pressure mechanism 802 that keeps the driven member S and the piezoelectric actuator 801 in pressure contact such that a prescribed frictional force is generated on the contact surfaces of the tip member 801a of the piezoelectric actuator 801 and the driven member S.

This driving apparatus is constructed such that prescribed drive signals are output to the piezoelectric elements 801b while the tip member 801a is maintained in somewhat elastic pressure contact with the driven member S, in order to cause the tip member 801a to move in the direction indicated by the arrow TA, so that the driven member S is rotated in the direction indicated by the arrow TI around the rotational axis 803.

The base member 801c of the piezoelectric actuator 801 is fixed by a support member 804. This base member 801c is held by the pressure mechanism 802 such that it can move forward and backward (i.e., in the horizontal directions in FIG. 18), and is pressured forward by the spring member 802 of the pressure mechanism 802. Consequently, the piezoelectric actuator 801 is maintained in pressure contact with the driven member S. Even if the position of contact changes due to decentered rotation of the driven member S, such change is absorbed by the elasticity of the spring member 802.

Using the above construction, if a high output is desired, driving should be caused such that the piezoelectric actuator 801 resonates. Therefore, typically, the material and mass of each component are designed based on simulation of the oscillation of each component that comprises the piezoelectric actuator 801, such that the tip member 801a will move in a desired elliptical path with this resonance. The oscillation of the base member 801c is also taken into consideration.

However, the problem arises that when the base member 801c is fixed, as in the conventional driving apparatus, the oscillation of the base member 801c is hindered by the support member 804, and the desired elliptical locus cannot be obtained.

These and other drawbacks and deficiencies exist in conventional systems and methods.

SUMMARY OF THE INVENTION

The present invention was created to address the above problem, and provide a driving apparatus that reliably causes the tip member to perform a desired motion and improves the precision of drive control regarding the driven member.

One embodiment of the invention comprises a driving apparatus including: a driving unit having multiple displacement elements, a synthesizing member that is connected to the tip end of each displacement element and is in pressure contact with the driven member, and a base member that supports the base ends of said displacement elements; a spring member that is attached to said base member in order to press said synthesizing member onto said driven member; and a drive signal output unit that outputs drive signals to each displacement element to cause said synthesizing member to perform a specific motion, wherein said driven member is driven in a prescribed direction by having said synthesizing member perform a specific motion in accordance with the drive signals output from said drive signal output unit, and wherein regulating members that regulate the displacement of said driving unit itself, which is caused by the driving carried out by said driving unit, are located at positions that face said base member and are opposite from said driven member, at a prescribed distance from said base member.

In one aspect of this embodiment, regulating members that regulate the displacement of the driving unit itself that is caused by the driving carried out thereby are located at positions facing the base member and opposite from the driven member, and at a prescribed distance from the base member, and therefore the driving unit and the regulating members are not in contact. Consequently, hindrance of the oscillation of the base member by the regulating members is prevented, and motion in accordance with the drive signals output from the drive signal output unit may be reliably performed by the synthesizing unit.

In another aspect of this embodiment, the prescribed distance should equal or exceed the amplitude of the oscillation of the driving unit that is generated by the displacement of the piezoelectric elements.

In another aspect of this embodiment, the prescribed distance can equal or exceed the sum of the amplitude of the oscillation of the driving unit that is generated by the displacement of the piezoelectric elements and the length that accommodates the change in the contact position of the driven member.

In this embodiment, even where the operation of the driving unit is stopped, the driven member continues to move in the same direction in which it has been driven for some while due to the inertia that works on the driven member, and the synthesizing unit that is in contact with the driven member follows the movement thereof. If the construction is such that the spring member applies pressure to the driven member only in the direction perpendicular to the contact surfaces of the driven member and the synthesizing unit, the spring member elastically deforms in a direction other than this perpendicular direction (hereinafter any direction other than the perpendicular direction will be referred to as 'a second direction') due to the force (hereinafter the 'following force') of the driven member that causes the synthesizing unit to follow its movement. When this following force becomes smaller than the restoring force that works in a second direction of the spring member, the synthesizing unit that followed the movement of the driven member begins to return toward the initial position prior to the driving of the driven member due to its restoring force, and conversely, the driven member begins to follow the movement of the synthesizing unit. When this occurs, based on the size of the restoring force, the synthesizing unit may come to a stop without returning to the initial position, or may pass the initial position before it comes to a stop. In other words, variations may occur in the position at which the driven member stops. In addition, the return of the synthesizing unit to the initial position translates into a loss of time insofar as speedy cessation of the movement of the driven member is concerned.

In another aspect of this embodiment, if the construction is such that the spring member exerts pressure in the direction perpendicular to the contact surfaces of the synthesizing unit and the driven member, and applies pressure to the driving unit such that it is maintained by the regulating members at a position that is upstream in terms of the direction of driving, even when the force of the driven member that causes the synthesizing unit to follow the movement thereof falls below the restoring force of the pressure unit, the driving unit is maintained by the regulating members at a position that is upstream in terms of the direction of driving, and the driving unit does not return to the initial position. Therefore, unlike in the example described above, no variations occur in the position at which the driven member stops, and as a result, the driven member is stopped with more precise control, the above time loss is eliminated, and less time is required for control to stop the driven member.

In another aspect of this embodiment, the driving unit can be supported such that it can rotate around a support member belonging to the regulating member.

The above and other aspects, features, and advantages of the present invention will become readily apparent from the following detailed description that is to be read in conjunction with the accompanying drawings.

DESCRIPTION OF THE PREFERRED EMBODIMENTS

A driving apparatus pertaining to the present invention will now be explained.

Figure 1:
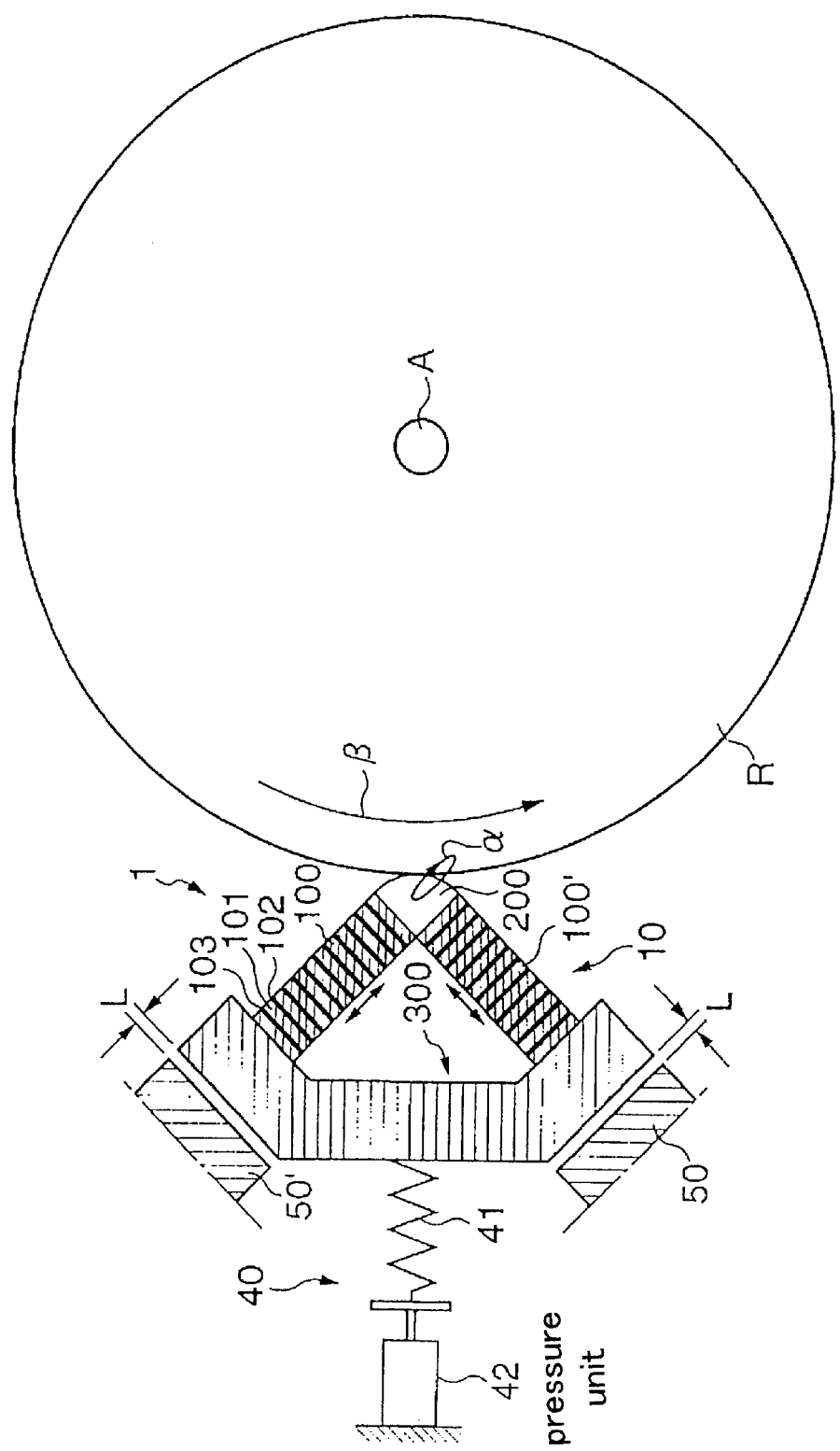
FIG. 1 is a drawing showing the construction of the driving apparatus pertaining to a first embodiment.

FIG. 1 is a drawing showing the construction of the driving apparatus pertaining to this embodiment.

As shown in FIG. 1, the driving apparatus 1 comprises a piezoelectric actuator 10, a pressure mechanism 40 and regulating members 50 and 50', and drives a rotor R such that it rotates in the direction indicated by the arrow β.

The piezoelectric actuator 10 comprises two displacement elements (multi-layer first and second piezoelectric elements) 100 and 100', which are located essentially perpendicular to each other, a tip member (synthesizing member) 200, which is made to adhere to the close-together ends of the piezoelectric elements using an adhesive agent, and a base member (support member) 300, which is made to adhere to the other ends of the first and second piezoelectric elements 100 and 100' using an adhesive agent. The first and second piezoelectric elements 100 and 100' are essentially identical to the piezoelectric element 100 aim shown in FIG. 2. Each component of the second piezoelectric element 100' is distinguished from that of the first piezoelectric element 100 by an apostrophe attached to the number.

Figure 2:
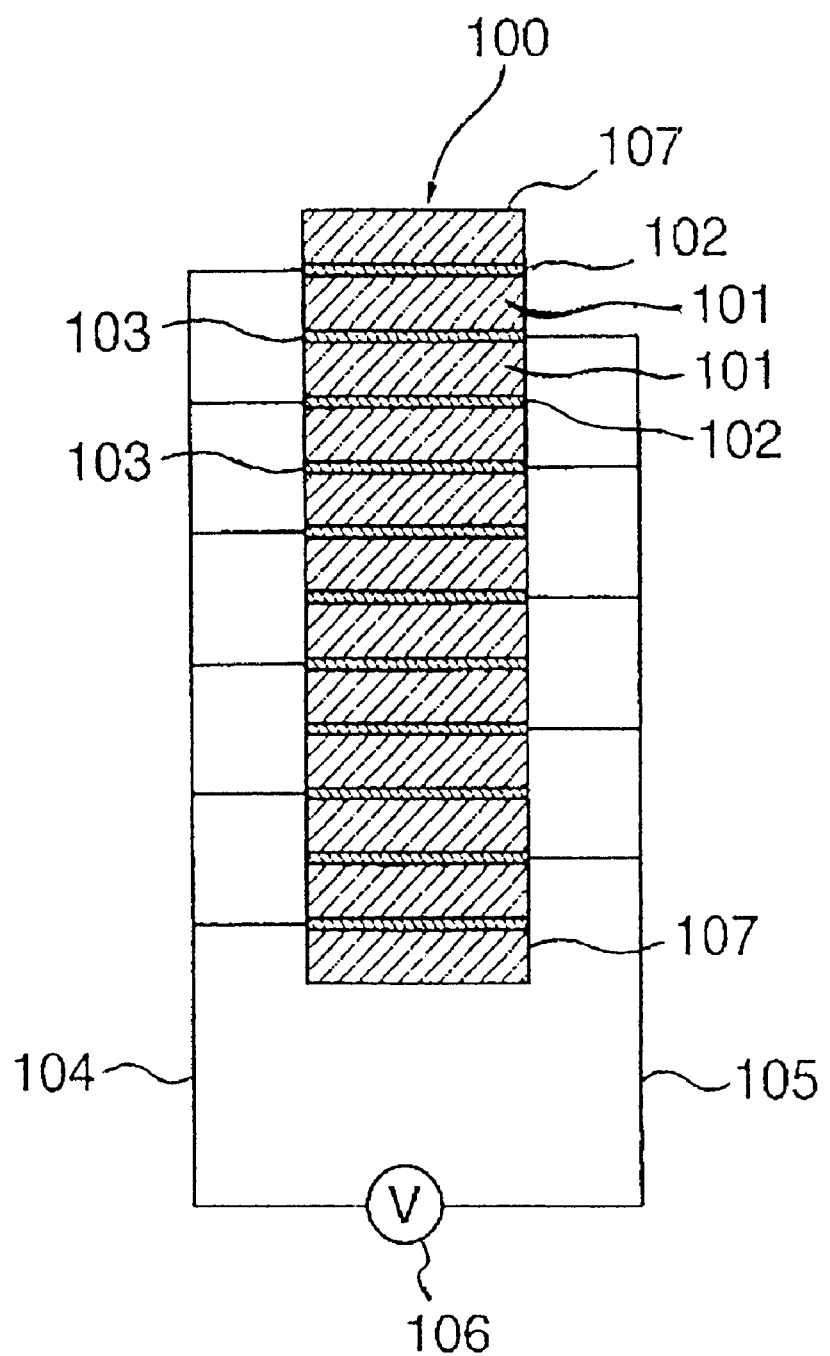
FIG. 2 is a drawing showing the construction of the multi-layer piezoelectric element used as the displacement element in the embodiment of the piezoelectric actuator in the driving apparatus of the present invention.

As shown in FIG. 2, the displacement element 100 comprises multiple ceramic plates 101 that exhibit piezoelectric characteristics, such as lead zirconate titanate (PZT), as well as electrodes 102 and 103 that are placed in an alternating fashion. Each ceramic plate 101 and electrode 102 and 103 are fixed together using an adhesive agent. The alternating electrodes 102 and 103 are connected to a drive source 106 via signal lines 104 and 105, respectively. When a prescribed voltage is impressed between the signal lines 104 and 105, an electric field that runs along the length of the piezoelectric element occurs in the ceramic plate between the signal lines, and the orientation of the electric field alternates between one ceramic plate and its adjacent ceramic plate. Therefore, the ceramic plates 101 are stacked such that every other ceramic plate 101 has the same polarity, i.e., each ceramic plate 101 has a polarity opposite that of its adjacent ceramic plate. A protective layer 107 is located at either end of the multi-layer piezoelectric element 100.

Figure 3:
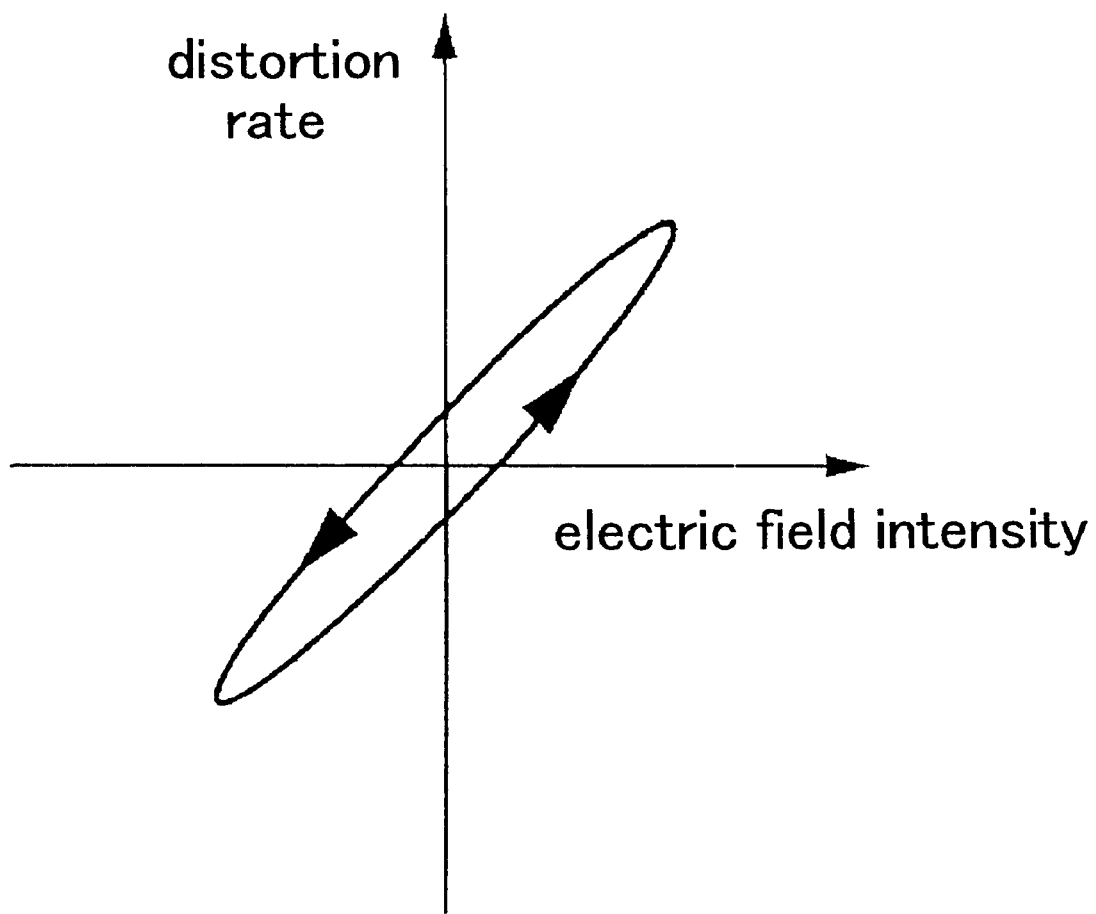
FIG. 3 is a drawing showing the relationship between the electric field that is generated between each electrode in the multi-layer piezoelectric element and the displacement of the piezoelectric element.

When a DC drive voltage is impressed between the electrodes 102 and 103 by the drive source 106, all ceramic plates 101 extend or contract in the same direction, such that the piezoelectric element 100 extends or contracts as a whole. In the area in which the electric field is small and the displacement history may be ignored, there is an essentially linear relationship between the electric field that is generated between the electrodes 102 and 103 and the displacement of the piezoelectric element 100, as shown in FIG. 3.

When an AC drive voltage (AC signals) are impressed between the electrodes 102 and 103 by the drive source 106, each ceramic plate 101 repeats extension or contraction in the same direction in accordance with the electric field, such that the piezoelectric element 100 extends or contracts as a whole. The piezoelectric element 100 has a unique resonance frequency that is determined by the construction and electric characteristics thereof. If the frequency of the AC drive voltage matches the resonance frequency of the piezoelectric element 100, the impedance drops, and the displacement of the piezoelectric element 100 increases. Because the displacement of the piezoelectric element 100 is small in relation to its outer dimensions, it is desired that this resonance phenomenon be utilized when the element is driven using a low voltage.

Returning to FIG. 1, a pressure mechanism 40 that operates to keep the tip member 200 in pressure contact with the rotor R is located behind the base member 300. The rotor R is supported such that it can rotate around the central shaft A. The pressure mechanism 40 includes a coil spring 41 (the spring member) and a pressure unit 42. One end of the coil spring 41 is attached to the center of the rear surface of the base member 300, and the other end thereof is connected to the pressure unit 42, such that the pressing force from this pressure unit 42 is transmitted to the rotor R via the coil spring 41. Consequently, when the rotor R rotates, a prescribed frictional force is generated in the direction opposite the direction of driving at the contact surfaces of the rotor R and the tip member 200. In this case, because the construction is such that pressure is exerted on the piezoelectric actuator, which is lightweight and small in size relative to the rotor R, as compared with the case where the piezoelectric actuator is fixed and the rotor is pressed onto the piezoelectric actuator by a pressure mechanism located on the side of the rotor, the pressure mechanism may be smaller in size, resulting in a more compact driving apparatus 1.

In the piezoelectric actuator 10 pertaining to this embodiment, regulating members 50 and 50' that receive the piezoelectric actuator 10 are located behind the base member 300. These regulating members 50 and 50' are located such that they are separated from the base member 300 by a distance L (which is essentially the same length as the amplitude of the oscillation of the piezoelectric actuator 10 that occurs due to the displacement of the piezoelectric elements 100 and 100'), such that they regulate the displacement of the piezoelectric actuator 10 at these positions. Where the position at which the rotor R and the tip member 200 come into contact may change due to decentering of the rotor R, the distance L is set to a length comprising the sum of the above amplitude and a length that accommodates such change. Consequently, the piezoelectric actuator 10 can follow the change in the contact position and accordingly perform stable driving at all times.

The material for the base member 300 is preferably stainless steel or an equivalent material that is strong and easy to fabricate. The material for the tip member 200 is preferably tungsten or an equivalent material that has a stable high friction coefficient and high resistance against wear.

The tip member 200 may be made to perform a prescribed motion by driving the first and second piezoelectric elements 100 and 100' using AC signals having a phase difference. When the tip member 200 is pressed onto the circumference of the rotor R, the elliptical motion (including circular motion) of the tip member 200 in the direction of the arrow ox may be converted into rotational motion of the rotor R in the direction of the arrow β. The material for the rotor R is preferably a lightweight metal such as aluminum, and in order to prevent wear caused by friction against the tip member 200, it is preferred that the surface be treated with alumite or an equivalent material.

Figure 4:
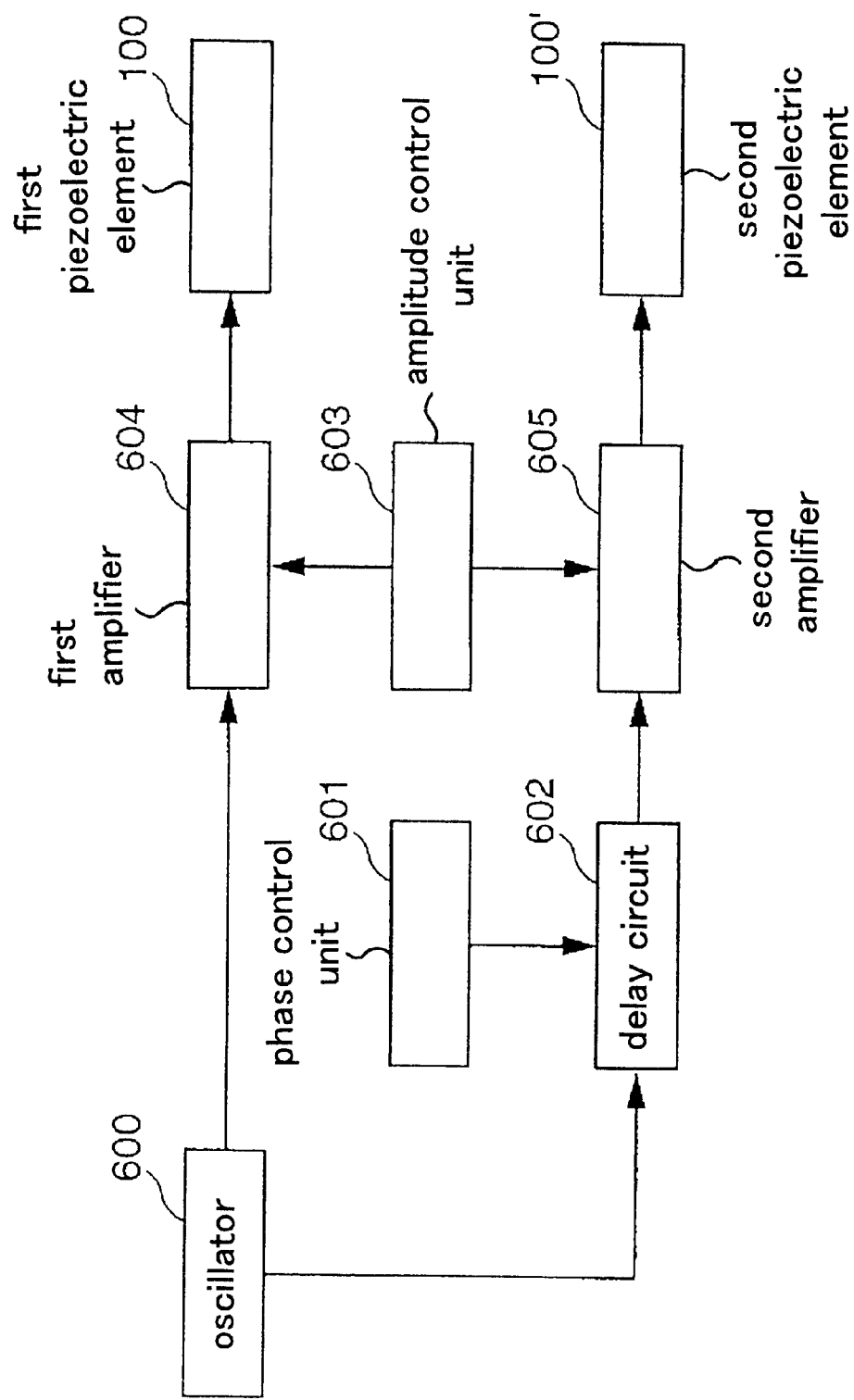
FIG. 4 is a block diagram of the driving apparatus.

FIG. 4 shows a block diagram of the construction of the driving apparatus 1 of this embodiment.

Figure 6:
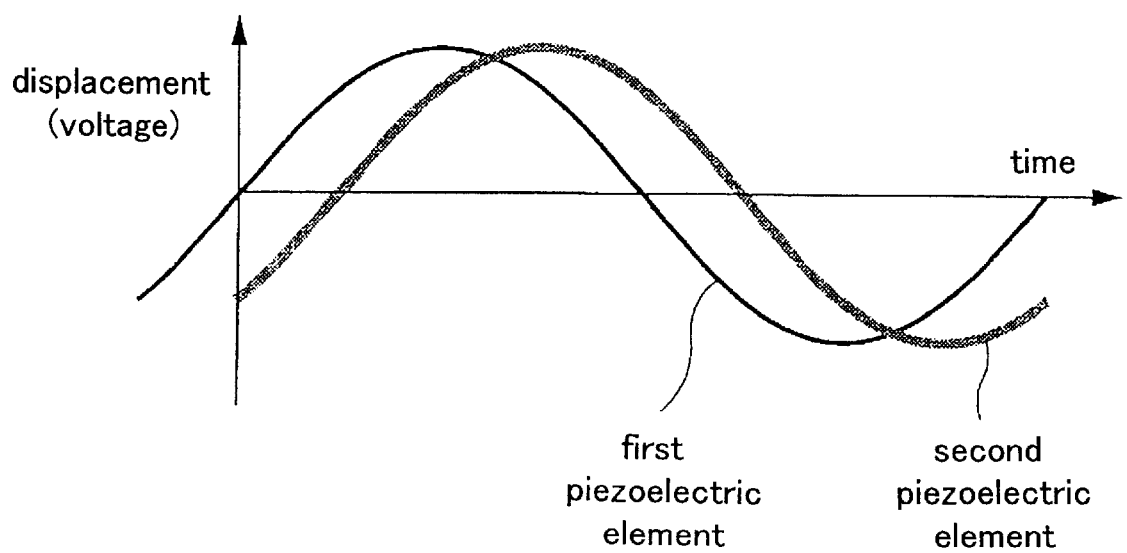
FIG. 6 is a drawing showing the voltages impressed to the first and second piezoelectric elements or the displacement of the elements.

The oscillator 600 generates the sine wave signal shown in FIG. 6.

The phase control unit 601 controls the delay circuit 602 in response to the rotation rate, drive torque, direction of rotation etc., of the rotor R, which comprises the driven member, and generates sine wave signals with offset phases.

The amplitude control unit 603 controls the degree of amplification carried out by the first amplifier 604 and the second amplifier 605, and amplifies the amplitudes of the two sine ho wave signals having offset phases. The sine wave signals amplified by the first and second amplifiers 604 and 605 are impressed to the first and second piezoelectric elements 100 and 100', respectively.

The principle of rotation of the rotor R caused by the driving apparatus 1 will now be explained.

Figure 5:
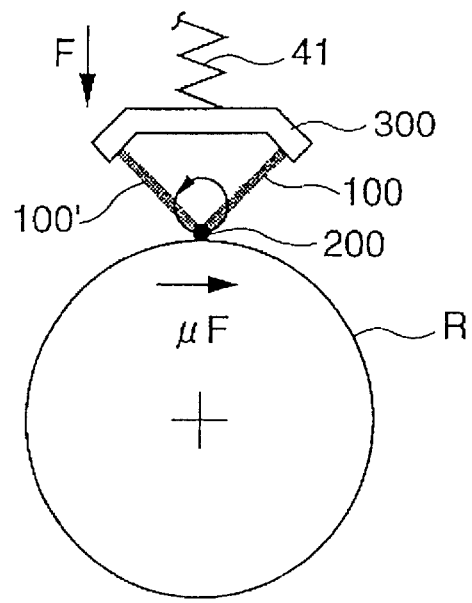
FIG. 5 is a drawing showing the situation in which the piezoelectric actuator is pressed against the rotor with a prescribed force by a pressure mechanism.

FIG. 5 shows a situation in which the piezoelectric actuator 10 is pressed against the rotor R by the pressure mechanism 40 exerting a prescribed pressure F. FIG. 6 shows the voltage impressed to the first and second piezoelectric elements 100 and 100' and the displacement of the elements.

When sinusoidal voltages having different phases as shown in FIG. 6 are impressed to the first and second piezoelectric elements 100 and 100', respectively, the first and second piezoelectric elements 100 and 100' exhibit sinusoidal displacement. As a result, the tip member 200 moves in a circular fashion, for example.

Where the frequencies of the sinusoidal voltages impressed to the first and second piezoelectric elements 100 and 100' are high and the rotation of the tip member 200 is rapid, the actuator itself cannot follow the displacement of the tip member 200, depending on the force applied by the coil spring 41, and the tip member 200 temporarily separates from the surface of the rotor R. Therefore, if the tip member 200 is moved in a prescribed direction while it is separated from the surface of the rotor R and if it is moved in the direction opposite the above prescribed direction while the tip member 200 is in contact with the surface of the rotor R, the rotor R may be made to rotate. This sequence is shown in FIG. 7.

Figure 7:
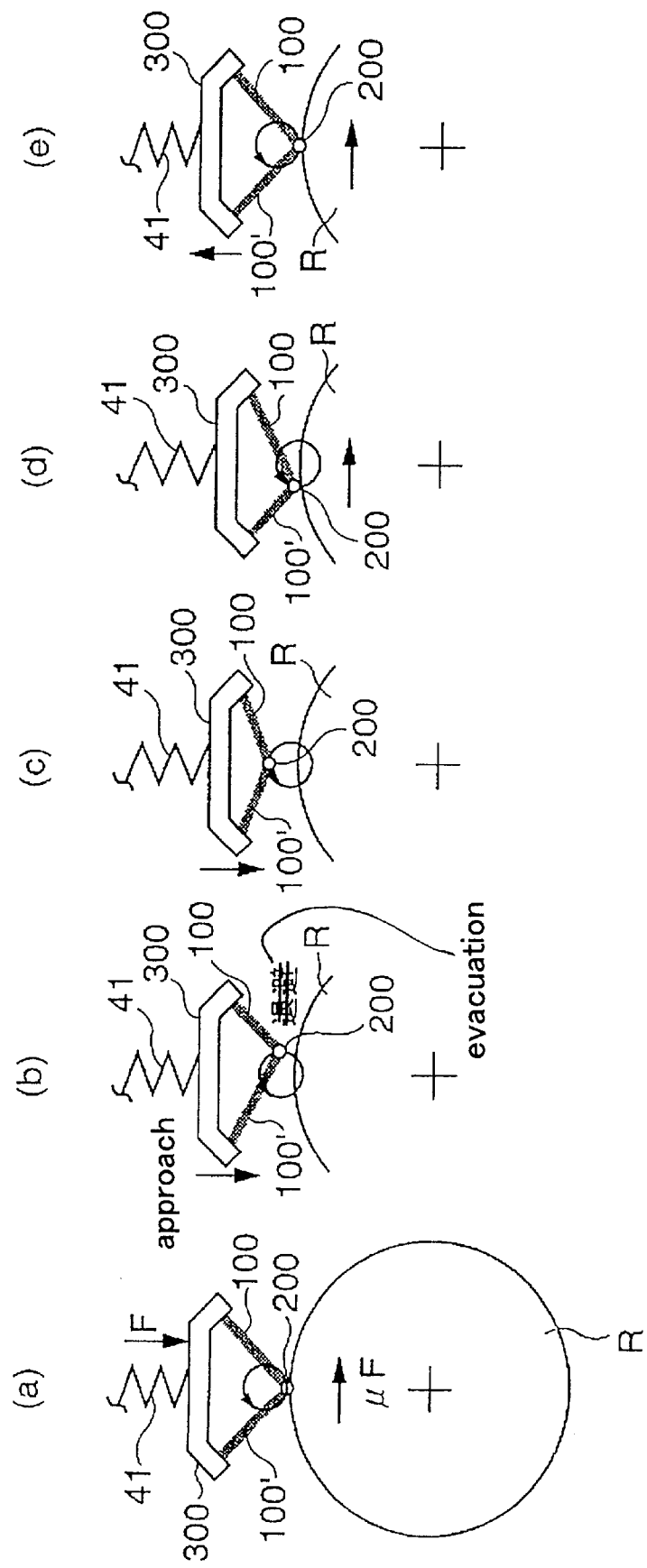
FIG. 7 is a drawing showing the first and second piezoelectric elements extending or contracting together with the degree of contact between the tip member and the rotor surface.

In FIG. 7, sections (a) and (e) show the situation in which the first and second piezoelectric elements 100 and 100' both extend and the tip member 200 is in contact with the surface of the rotor R, section (b) shows the situation in which the first piezoelectric element 100 contracts and the second piezoelectric element 100' extends, causing the tip member 200 to separate from the surface of the rotor R, section (c) shows the situation in which the first and second piezoelectric elements 100 and 100' both contract and the tip member 200 is separated from the surface of the rotor R, and section (d) shows the situation in which the first piezoelectric element 100 extends and the second piezoelectric element 100' contracts, so that the tip member 200 catches up with the movement of the rotor R and is in contact with the surface of the rotor R. As can be seen from FIG. 7, by alternately repeating the situation in which the tip member 200 and the rotor R are in contact and the situation in which they are separated, the rotor R may be made to rotate.

Where the frequencies of the sinusoidal voltages impressed to the first and second piezoelectric elements 100 and 100', i.e., the drive frequencies for the piezoelectric elements, are low and the rate of rotation of the tip member 200 is slow, the piezoelectric actuator 10 itself follows the displacement of the tip member 200 due to the force applied by the coil spring 41, and the tip member 200 is not separated from the surface of the rotor R and is driven to move forward and backward while it is in contact with the surface of the rotor R. Therefore, in this case, the rotor R cannot be made to rotate.

The drive signals to drive the first and second piezoelectric elements 100 and 100' will now be explained. When two motions that are perpendicular to and independent of each other are synthesized, the crossing points thereof form a locus in accordance with the elliptical oscillation expression (Lissajous expression). Regarding the piezoelectric actuator 10 of this embodiment, various loci may be obtained by changing the amplitudes of or phase difference between the drive signals to drive the first and second piezoelectric elements 100 and 100'. Where the amplitudes of the drive signals are identical, the locus is basically as shown in sections (a) through (e) of FIG. 8 for a 0°, 45°, 90°, 135° and 180° phase difference between the drive signals, respectively.

By controlling the locus of the tip member 200 in this way, the direction, rate, force (torque) and other parameters of the rotation of the rotor R may be controlled. Specifically, if the diameter of the locus of the tip member 200 along the tangent line of the rotor R is increased, the rate of rotation increases. If the diameter of the locus of the tip member 200 along the normal line of the rotor R is increased, the force of rotation increases. Furthermore, if the phases are inverted, the direction of rotation may be reversed.

Figure 8:
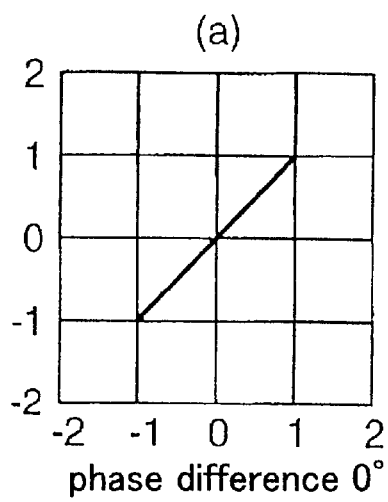
FIG. 8 is a drawing showing the loci when the phase difference between the drive signals is 0°, 45°, 90°, 135° and 180°, respectively.
Figure 8:
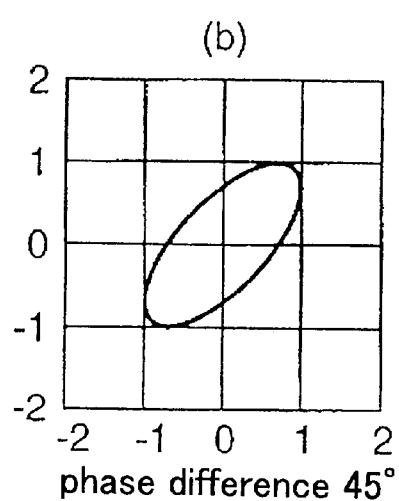
Figure 8:
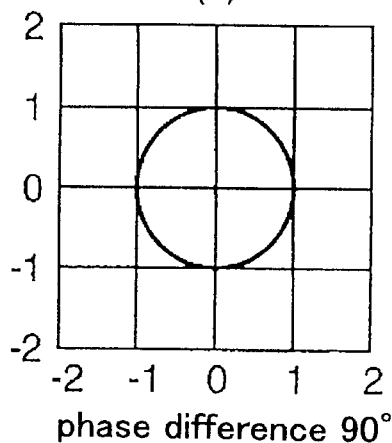
Figure 8:
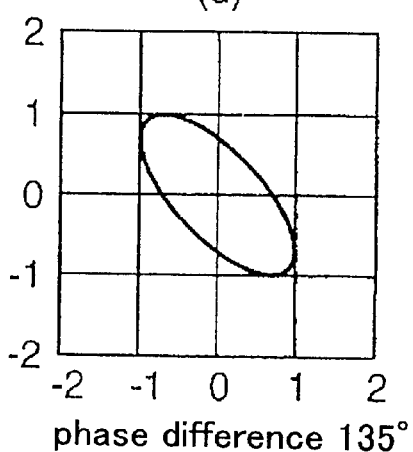
Figure 8:
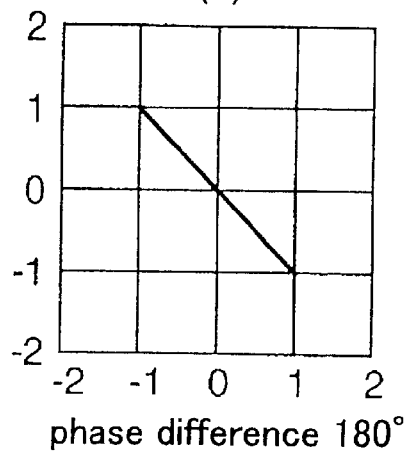
Figure 9:
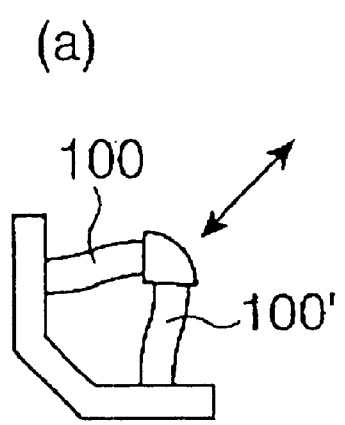
FIG. 9 is a drawing showing the piezoelectric elements extending or contracting in the same phase mode and the opposite phase mode.
Figure 9:
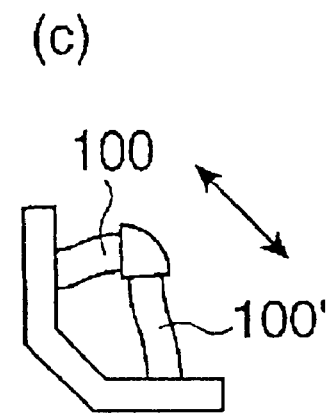

In order to make the locus of the movement of the tip member 200 conform to the loci shown in sections (a) through (e) of FIG. 8 when resonance exists, the following conditions must be met as well. As shown in FIG. 9, the piezoelectric actuator 10 has multiple unique oscillation modes. As shown in section (a), a mode in which the piezoelectric elements 100 and 100' extend and contract based on an identical phase (hereinafter the 'identical phase mode'), and a mode in which the piezoelectric elements 100 and 100' extend and contract based on opposite phases (hereinafter the 'opposite phase mode') take place. In order to obtain a desired locus when resonance exists, the resonance frequency for the identical phase mode and that for the opposite phase mode must be matched and driving must be performed using that resonance frequency.

The features of the driving apparatus 1 of this embodiment will now be explained.

As described above, the driving apparatus 1 is characterized in that it has regulating members 50 and 50' located behind the base member 300 at a distance comprising a length essentially equal to the amplitude of the oscillation caused in the piezoelectric actuator 10.

Figure 10:
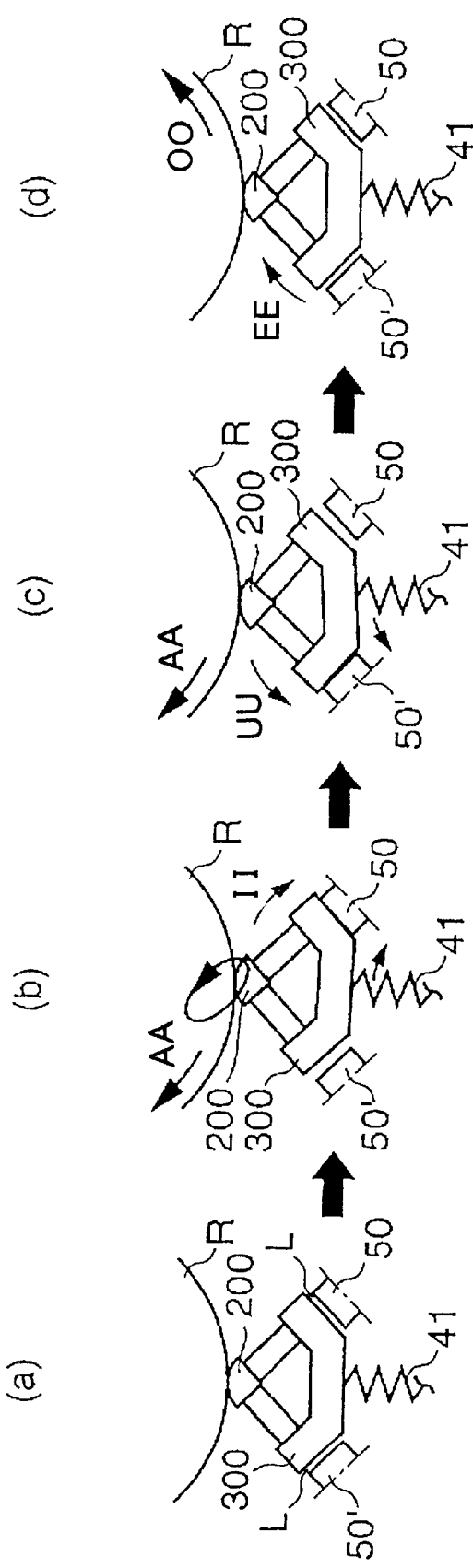
FIG. 10 is a drawing showing the operation of the feature in the first embodiment.

FIG. 10 shows the operation of this feature.

(a) shows the initial state of the driving apparatus 1 before operation.

As shown in section (b), when the rotor R is driven in the direction of the arrow AA by the driving apparatus 1, the piezoelectric actuator 10 moves in the direction of the arrow II due to the reactive force of the rotor R, and the coil spring 41 becomes inclined toward the right, such that the right rear surface of the base member 300 comes into light contact with the regulating member 50. When this occurs, the piezoelectric actuator 10 oscillates while it is in light contact with the regulating member 50.

Subsequently, as shown in section (c), after the driving of the rotor R by the piezoelectric actuator 10 is stopped, the rotor R continues to rotate in the direction of the arrow AA due to inertia. The tip member 200 follows the rotation of the rotor R, so that the piezoelectric actuator 10 moves in the direction of the arrow UU, and the coil spring 41 becomes inclined toward the left, so that the left rear surface of the base member 300 comes into light contact with the regulating member 50'.

As shown in section (d), when the force that causes the tip member 200 to follow the rotation of the rotor R becomes smaller than the recovering force of the coil spring 41 (the force that attempts to restore the coil spring 41 to the straight state from the leftward-inclined state) based on the frictional force that operates on the contact surfaces of the rotor R and the tip member 200, the piezoelectric actuator 10 moves in the direction of the arrow EE toward the initial position shown in section (a) due to this recovering force, such that the rotor R comes to a stop after following the above movement in the direction opposite the direction of driving, i.e., the direction of the arrow OO.

Because the construction is such that the piezoelectric actuator 10 comes into light contact with the regulating members 50 and 50' when it moves, thanks to the distance L, which is essentially the same length as the amplitude of the oscillation of the piezoelectric actuator 10 and separates the base member 300 and the regulating members 50 and 50', hindrance of the oscillation of the base member 300 as well as the locus of motion of the tip member 300 by the regulating members 50 and 50' may be prevented. Therefore, the tip member 300 may be made to move in a desired fashion in accordance to the drive signals, and the precision of the rotation control of the rotor R may be improved. Furthermore, where the position at which the tip member 200 and the rotor R contact each other changes, if the distance L comprises a length equivalent to the amplitude of oscillation plus the length that accommodates such change, the piezoelectric actuator 10 can absorb the change in the contact position, ensuring stable driving at all times.

The driving apparatus pertaining to a second embodiment of the present invention will now be explained. The same numbers used in connection with the first embodiment will be used to indicate each component.

The driving apparatus 1 pertaining to this embodiment comprises the driving apparatus of the first embodiment and, as shown in FIG. 11(a), is characterized in that the coil spring 41 is attached at a position located to the right relative the attachment position in the first embodiment, which is shown using a dotted line, and pressure is applied to the piezoelectric actuator 10 while the base member 300 is in light contact with the left regulating member 50' (which is located in an upstream position in terms of the direction of driving).

Figure 11:
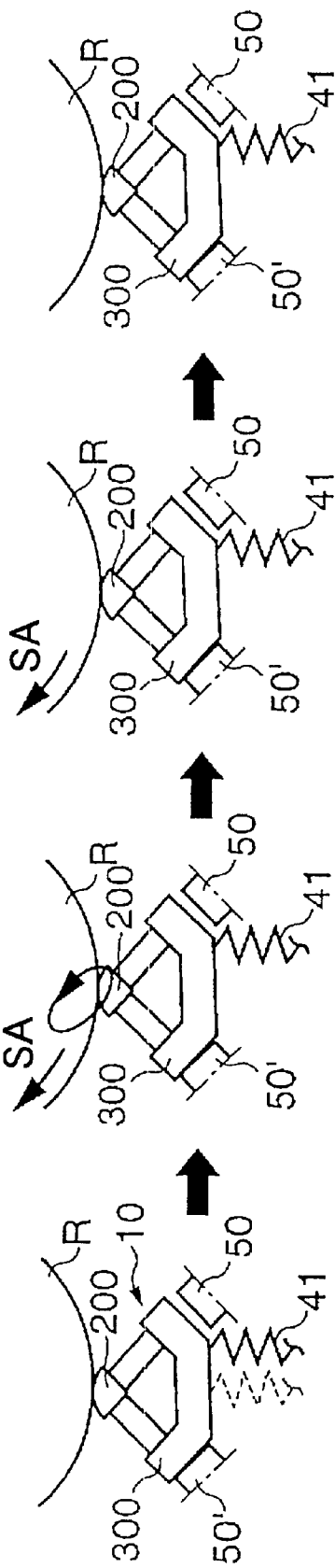
FIG. 11 is a drawing showing the operation of the feature in the second embodiment.

FIG. 11 shows the operation of this feature.

As shown in FIG. 11(b), when the rotor R is driven by the piezoelectric actuator 10 in the direction indicated by the arrow SA, the piezoelectric actuator 10 receives a reactive force from the rotor R. When the piezoelectric actuator 10 receives this reactive force, if the force applied by the coil spring 41 is adjusted to a prescribed amount, the base member 300 does not come into contact with the right regulating member 50' as it does in the first embodiment, and the base member 300 is maintained in the state before driving, i.e., the state shown in section (a), due to the force from the coil spring 41.

Subsequently, as shown in section (c), after the driving of the rotor R by the piezoelectric actuator 10 is stopped, the rotor R continues to rotate in the direction of the arrow SA due to inertia, and the tip member 200 follows the rotation of the rotor R. Therefore, as shown in section (d), the state in which the piezoelectric actuator 10 is in contact with the left regulating member 50' is maintained until the rotor R stops due to the frictional force that operates on the contact surfaces of the rotor R and the tip member 200. In this case, although the base member 300 is in stronger contact with the left regulating member 50' relative to the states described by the sections (a) and (b) above, this does not pose any problems because the piezoelectric actuator 10 is not operating.

As described above, the construction, in which the coil spring 41 is attached to the right of the center position of the base member 300, i.e., downstream in terms of the direction of driving, such that the piezoelectric actuator 10 is in light contact at all times during driving of the rotor R with the left regulating member 50', which is located upstream in terms of the direction of driving, adds the following benefit to the first embodiment.

In the first embodiment, depending on the size of the restoring force of the coil spring 41, the tip member 200 may stop without returning to the initial position (the position shown in FIG. 10(*d*)), or may pass the initial position before it comes to a stop. This causes variations in the position at which the rotor R stops, and after the operation of the piezoelectric actuator 10 stops, a wasteful motion to return to the initial position, i.e., a motion to move from the state in FIG. 10(*c*) to that in FIG. 10(*d*), takes place.

In contrast, in the second embodiment, when the operation of the piezoelectric actuator 10 is stopped, it is still in contact with the left regulating member 50', and therefore, the above wasteful motion does not take place, and the rotor R is immediately stopped based on the frictional force that operates on the contact surfaces of the rotor R and tip member 200. Therefore, the problem of variations in the position at which the rotor R stops may be prevented, and the time required for the rotor R to stop may be reduced to the same extent.

Figure 12:
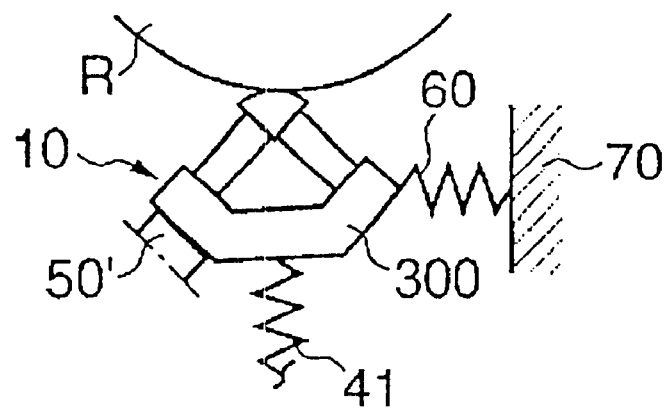
FIG. 12 is a drawing showing a modification of the second embodiment.
Figure 13:
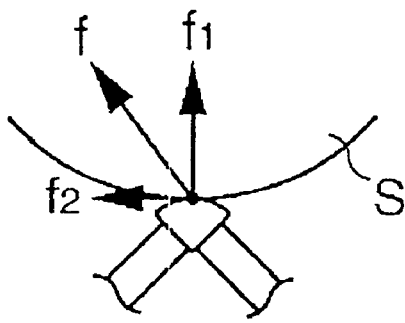
FIG. 13 is a drawing showing the force applied by the pressure mechanism.

Besides the construction in which the coil spring 41 is attached to the left side of the base member 300 as described above, in a different possible construction, as shown in FIG. 12, the right regulating member 50 is removed from the first embodiment, and a pressure member (such as a coil spring, for example) 60 that is supported by a support member 70 at one end thereof is attached to the right end of the base member 300. In other words, the piezoelectric actuator 10 may be kept in light contact with the regulating member 50' using the force from the pressure member 60. In short, the construction should be such that when a member having a column-shaped outer circumference, such as the rotor R, is driven to rotate using the driving apparatus 1, as shown in FIG. 13, the pressure mechanism 40 exerts force not only in the direction of the normal line (f1) extending from the contact point of the driven member S and the tip member 200, i.e., toward the center of the driven member S, but also in the direction of the tangent line (f2). It is preferred that the above direction of the tangent line match the direction of the driving.

Figure 14:
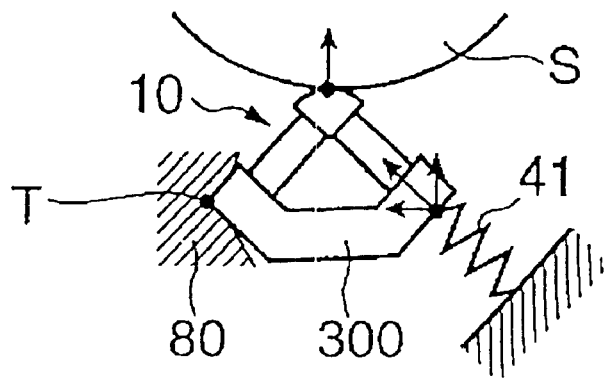
FIG. 14 is a drawing showing a modification of the second embodiment.

It is also acceptable if the construction is such that the coil spring 41 is attached to the right slope of the base member 300, i.e., the slope located downstream in terms of the direction of driving, and the base member 300 is supported such that it can rotate with the corner of its left end as the fulcrum. For example, as shown in FIG. 14, the construction of this type can be such that a support member 80 having a groove that corresponds to the configuration of the above corner is used, so that force is applied to the piezoelectric actuator 10 toward the support member 80 at all times during the driving of the rotor R based on the moment derived from the component force of the coil spring 41, with the corner of the base member 300 engaged with the groove of the support member 80. It is also acceptable if a hinge is located at the corner of the base member 300, for example, in place of the support member 80, such that the piezoelectric actuator 10 can rotate with this hinge operating as a fulcrum.

Using this construction, the piezoelectric actuator 10 may also be maintained at a constant position, the problem of variations in the position at which the rotor R stops may be eliminated, and the time required for the rotor R to come to a stop may be reduced.

The present invention may be applied not only to the rotational driving of a member having a column-like circumference such as the rotor R, but also to the linear driving of a rod-like member, for example.

The member that applies force to the piezoelectric actuator 10 is also not limited to the coil spring 41, and may comprise a member that can elastically deform not only in the direction of the normal line but also in the direction of the tangent line, such as a plate spring or a helical coil spring, for example.

In each embodiment above, the distance L between the base member 300 and the regulating members 50 and 50' has essentially the same length as the amplitude of the oscillation of the piezoelectric actuator 10, but even if the distance L is larger than this amplitude, the regulating members 50 and 50' may be prevented from affecting the motion of the tip member 200 as well.

The driving apparatus 1 pertaining to each embodiment may be applied in an imaging device as shown below.

Figure 15:
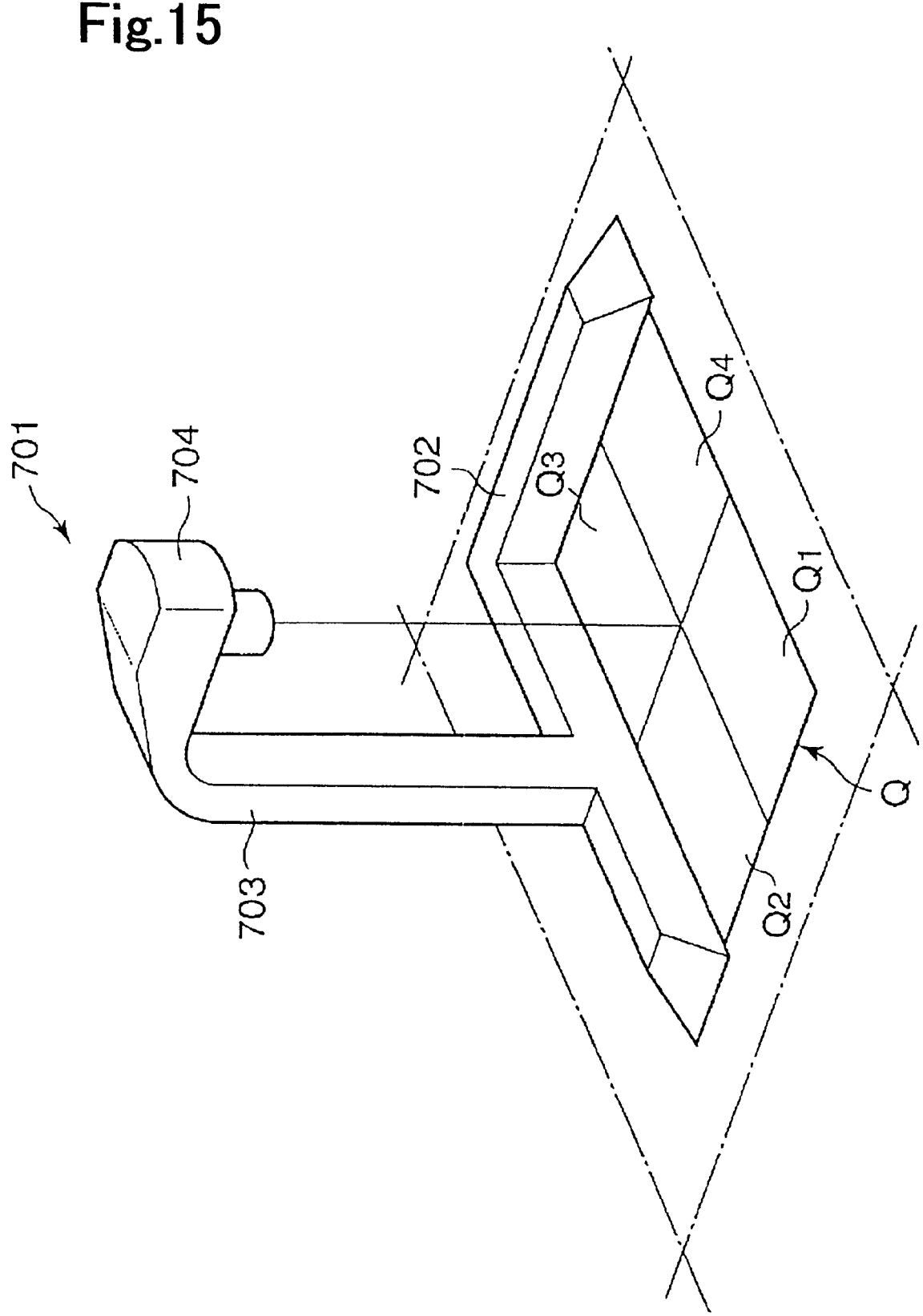
FIG. 15 is a perspective view showing the entire construction of an imaging device in which the driving apparatus pertaining to the present invention is applied.

As shown in FIG. 15, the imaging device 701 has an L-shaped stopper 702 that indicates the standard position for the placement of an original document Q (the object), an arm 703 that rises from an appropriate part of the stopper 702, and a head 704 that is mounted to the top end of the arm 703. The image of the original document Q, which is placed along the stopper 702, is sequentially captured by a image forming unit 710, an image pickup unit 720 and a scanning unit 730 (which are included in the head 704 and are described below), as quarter images, which comprise the entire image of the original document divided once horizontally and once vertically, and the quarter images Q1 through Q4 are synthesized into one whole image.

Figure 16:
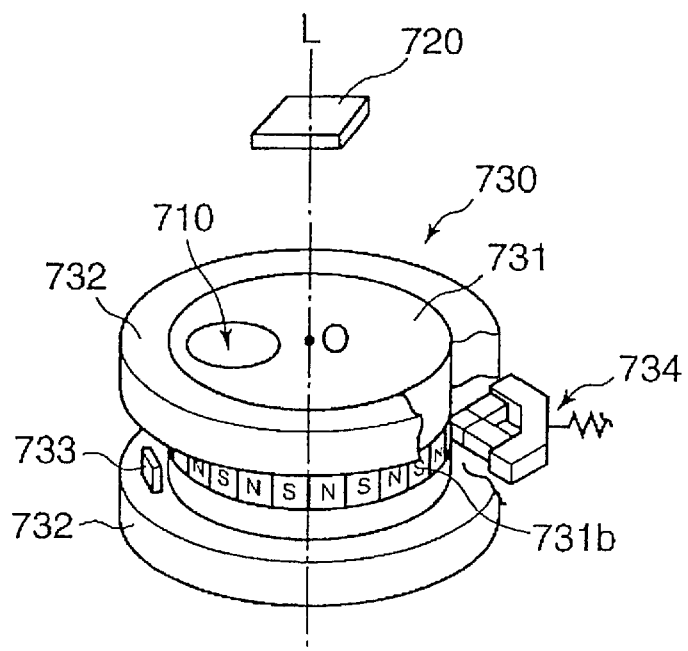
FIG. 16 is a perspective view of the image forming unit and the scanning unit.

FIG. 16 is a perspective view of the image forming unit 710, image pickup unit 720 and scanning unit 730 incorporated in the head 704.

As shown in FIG. 16, the image forming unit 710 includes lenses such as zoom lenses, and forms the image of the object on the image pickup surface of the image pickup unit 720 located above the image forming unit 710. The image forming unit 710 is constructed such that the imaging magnification and the focal point position may be changed and adjusted by the lenses driven using motors (not shown in the drawing).

The image pickup unit 720 comprises a CCD color area sensor (hereinafter the 'CCD') having a rectangular image pickup area. It performs photoelectric conversion of the image of the object formed by the image forming unit 710 into image signals of R (red), G (green), and B (blue) color components (i.e., signals comprising arrays of pixel signals received by each pixel) and outputs them. It is also acceptable if the image pickup unit 720 comprises a CMOS-type color area sensor having a rectangular image pickup area.

As shown in FIG. 16, the scanning unit 730 has a rotor 731, an MR element 733 and a driving apparatus 734 pertaining to the present invention.

Figure 17:
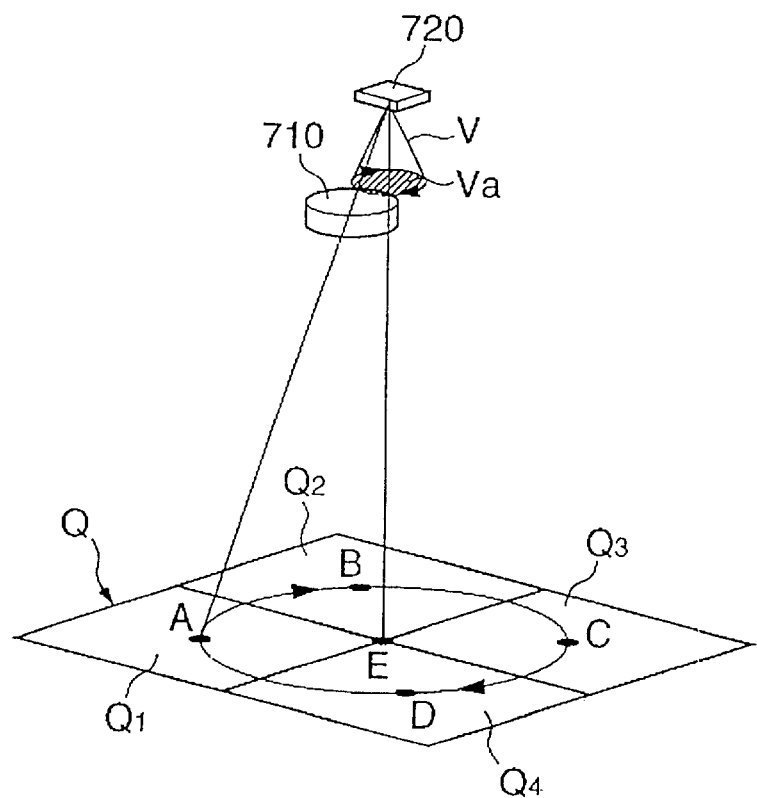
FIG. 17 is a drawing to explain the operation in which an image is captured in quarters by the imaging device.
Figure 18:
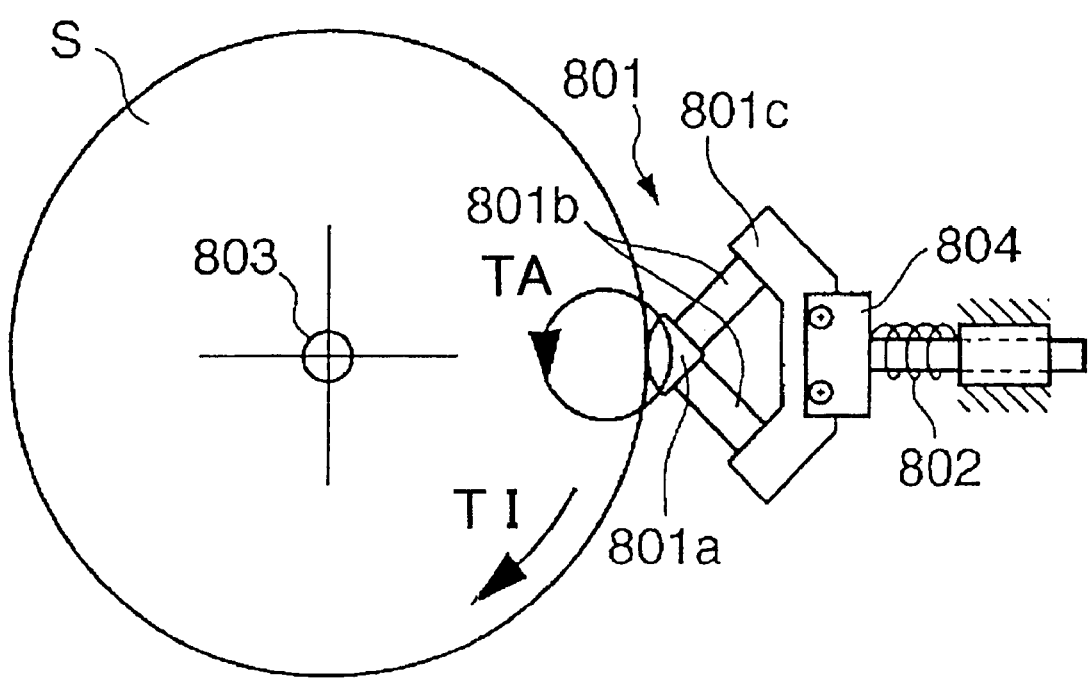
FIG. 18 is a drawing showing the conventional driving apparatus in a summary fashion.

As shown in FIGS. 16 and 17, the rotor 731 is an essentially column-like member that is supported in the inner wall (not shown in the drawings) of the head 704 by a bearing 732 such that it can rotate relative thereto, and is engaged with the outer surface of the image forming unit 710. Because the image forming unit 710 is engaged with the rotor 731 at a position apart from the axis of the rotor 731, the locus of movement of the image forming unit 710 when seen from the axis becomes a circle around the axis of the rotor 731, and as shown in FIG. 17, if the position of the image pickup unit 720 is deemed the apex of a cone V, the image forming unit 10 moves on the bottom plane Va of the cone V.

The image forming unit 710 revolves around the axis of the rotor 731 and is stopped at prescribed positions in order to capture the quarter images Q1 through Q4.

The lower surface of the rotor 731 comprises a magnetic field generator 731b around the circumference of which S and N poles are alternately located, and an MR element 733 is attached to an appropriate place on the top surface of the bottom bearing 732. The angle of rotation of the rotor 731 is detected using the MR element 733 and the magnetic field generator 731b.

A driving apparatus 734 pertaining to each embodiment above, which drives the rotor 731 to rotate around the axis L, is located adjacent to the rotor 731. When the rotor 731 is driven to rotate by this driving apparatus 734, the direction of the line of magnetic force and the density thereof that passes the MR element 733 due to the rotation of the magnetic field generator 731b changes in accordance with the polarity of the part of the magnetic field generator 731b that faces the MR element 733, whereupon the electric resistance of the MR element 733 changes. Based on this phenomenon, a current is drawn to the MR element 733 and the changes in the voltage at either end thereof are detected in order to detect the number of poles that have passed near the MR element 733. Through this detection, the angle of rotation of the rotor 731 is calculated.

As described above, by applying the driving apparatus pertaining to the present invention in an imaging device such as the one described above, the precision regarding the position at which the image forming unit 710 stops improves, resulting in improved imaging precision. In addition, because the time required for the rotor 731 to come to a halt is reduced, the time required for the performance of imaging by the imaging device may be reduced.

According to the present invention, regulating members that regulate the displacement of the driving unit itself that is caused by the driving carried out thereby are located at positions facing the base member and opposite from the driven member, and at a prescribed distance from the base member, and therefore the driving unit and the regulating members are not in contact. Consequently, hindrance of the oscillation of each displacement element by the regulating members is prevented, and motion in accordance with the drive signals output from the drive signal output unit may be reliably performed by the synthesizing unit.

Furthermore, because the spring member exerts pressure in the direction perpendicular to the contact surfaces of the synthesizing unit and the driven member, and applies pressure to the driving unit such that it is maintained by the regulating members at a position upstream in terms of the direction of driving, even when the force of the driven member that causes the synthesizing unit to follow the movement thereof becomes smaller than the restoring force of the pressure unit, the driving unit is maintained by the regulating members at a position upstream in terms of the direction of driving, and the driving unit does not return to the initial position, which would constitute wasted motion. Therefore, no variations occur in the position at which the driven member stops, as described above, resulting in superior precision in control in stopping the driven member, elimination of the above time loss, and a shorter amount of time required to stop the driven member.

Although certain presently preferred embodiments and examples of the present invention have been specifically described herein, it will be apparent to those skilled in the art to which the invention pertains that variations and modifications of the various embodiments and examples shown and described herein may be made with departing from the spirit and scope of the invention.

What is claimed is:

1. A driving apparatus comprising:
    a driving unit having a plurality of displacement elements;
    a synthesizing member connected to a tip end of each of the plurality of displacement elements, the synthesizing member being in pressure contact with a driven member;
    a base member supporting base ends of the plurality of displacement elements;
    a spring member attached to the base member biasing the synthesizing member onto the driven member;
    a drive signal output unit outputting drive signals to each of the plurality of displacement elements causing the synthesizing member to perform a specific motion, the driven member being driven in a prescribed direction by the synthesizing member performing the specific motion; and
    a regulating member regulating a displacement of the driving unit, the regulating member facing the base member opposite from the driven member at a prescribed distance from the base member,
    wherein the prescribed distance approximately equals or exceeds an amplitude of oscillation of the driving unit caused by a displacement of the plurality of displacement elements.

2. A driving apparatus according to claim 1, wherein the prescribed distance approximately equals or exceeds a sum of the amplitude of oscillation of the driving unit caused by the displacement of the plurality of the displacement elements and a length that accommodates a change in a contact position of the driven member.

3. A driving apparatus according to claim 1, wherein the spring member applies a force to the driving unit in a direction perpendicular to a contact surface of the synthesizing member and driven member, and the regulating member maintains the driving unit at an upstream position relative to the prescribed direction of driving.

4. A driving apparatus according to claim 1, wherein the specific motion is reciprocating.

5. A driving apparatus according to claim 4, wherein the specific motion is one of circular, elliptical, and linear.

6. A driving apparatus according to claim 3, wherein the spring member applies a force to the driving unit in a direction parallel to the contact surface of the synthesizing member and driven member.

7. A driving apparatus according to claim 1, wherein the plurality or displacement elements have a truss type structure.

8. A driving apparatus according to claim 1, wherein the plurality of displacement elements are piezoelectric elements made from PZT.

9. A driving apparatus comprising:

a driving unit having a plurality of displacement elements;

a synthesizing member connected to a tip end of each of the plurality of displacement elements, the synthesizing member being in pressure contact with a driven member;

a base member supporting base ends of the plurality of displacement elements;

a spring member attached to the base member biasing the synthesizing member onto the driven member;

a drive signal output unit outputting drive signals to each of the plurality of displacement elements causing the synthesizing member to perform a specific motion, the driven member being driven in a prescribed direction by the synthesizing member performing the specific motion;

a first regulating member regulating a displacement of said driving unit, the first regulating member being located at a position facing the base member opposite from the driven members the spring member applying a force to the driving unit in a direction perpendicular to a contact surface of the synthesizing member and driven member, and the regulating member maintaining the driving unit at an upstream position relative to the direction of driving; and a second regulating member regulating a displacement of the driving unit, the second regulating member facing the base member opposite from the driven member at a prescribed distance from the base member, wherein the prescribed distance of the second regulating member approximately equals or exceeds an amplitude of oscillation of the driving unit caused by a displacement of the plurality of displacement elements.

10. A driving apparatus according to claim 9, wherein the first regulating member further comprises a support member rotatably supporting the driving unit and acting as a fulcrum.

11. A driving apparatus according to claim 9, wherein the specific motion is reciprocating.

12. A driving apparatus according to claim 11, wherein the specific motion is one of circular, elliptical, and linear.

13. A driving apparatus according to claim 9, wherein the plurality of displacement elements have a truss type structure.

14. A driving apparatus according to claim 9, wherein the plurality of displacement elements are piezoelectric elements made from PZT.

15. A method for driving a driven member using a driving unit having a plurality of displacement elements, a synthesizing member connected to a tip end of each of the plurality of displacement elements, a regulating member regulating a displacement of the driving unit and a base member supporting base ends of the plurality of displacement elements, the method comprising:

biasing the synthesizing member into contact with the driven member;

outputting drive signals to each of the plurality of displacement elements;

moving the synthesizing member in a specific motion;

driving the driven member in a prescribed direction based on the specific motion performed by the synthesizing member; and placing the regulating member to face the base member opposite from the driven member at a prescribed distance form the base member, the prescribed distance being approximately equal to or greater than an amplitude of oscillation of the driving unit caused by a displacement of the plurality of displacement elements.

16. A method for driving according to claim 15, further comprising accommodating a change in a contact position of the driven member.

17. A method of driving according to claim 15, further comprising applying a force to the driving unit in a direction perpendicular to a contact surface of the synthesizing member and driven member, and maintaining the driving unit at an upstream position relative to the prescribed direction of driving.

18. A method of driving according to claim 15, further comprising moving the synthesizing member in a reciprocating motion.

19. A method of driving according to claim 15, further comprising moving the synthesizing member in one of a circular motion, an elliptical motion, and a linear motion.

* * * * *